United States Patent
Hagano (10) Patent No.: US 10,626,005 B2
(45) Date of Patent: Apr. 21, 2020

(54) FUELING DEVICE

(71) Applicant: TOYODA GOSEI CO., LTD., Kiyosu-shi, Aichi-ken (JP)

(72) Inventor: Hiroyuki Hagano, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 86 days.

(21) Appl. No.: 15/708,570

(22) Filed: Sep. 19, 2017

(65) Prior Publication Data

US 2018/0093877 A1  Apr. 5, 2018

(30) Foreign Application Priority Data

Sep. 30, 2016 (JP) ................................. 2016-192632

(51) Int. Cl.
  *B67D 7/32* (2010.01)
  *B67D 7/00* (2010.01)
  (Continued)

(52) U.S. Cl.
  CPC ............ *B67D 7/3227* (2013.01); *B60K 15/04* (2013.01); *B67D 7/005* (2013.01); *B67D 7/04* (2013.01);
  (Continued)

(58) Field of Classification Search
  CPC .. B60K 2015/0458; B60K 2015/03576; B60K 2015/048; B67D 7/3227
  (Continued)

(56) References Cited

U.S. PATENT DOCUMENTS 5,033,517 A * 7/1991 Bucci ..................... B60K 15/04
  141/286
5,730,194 A * 3/1998 Foltz ...................... B60K 15/04
  137/588

(Continued)

FOREIGN PATENT DOCUMENTS

CN  107521334 A  12/2017
JP  H04-29428 U  3/1992

(Continued)

OTHER PUBLICATIONS

Office Action dated Dec. 18, 2019 issued in corresponding CN patent application No. 201710865827.2.

(Continued)

*Primary Examiner* — Reinaldo Sanchez-Medina
*Assistant Examiner* — Nicole Gardner
(74) *Attorney, Agent, or Firm* — Posz Law Group, PLC (57) ABSTRACT

A channel forming member is attached to a filler neck on a nozzle insertion side where a fueling nozzle is to be inserted. The channel forming member includes a barrier section that forms an insertion flow path section for the fueling nozzle in the fuel flow path on the nozzle insertion side, while forming an annular channel surrounding the insertion flow path section so as to separate the channel from the insertion flow path section. The channel forming member further includes the following provided to the barrier section: an atmosphere communication hole for making the channel communicate with the atmosphere; a flow path communication hole for making the channel communicate with an insertion end flow path section downstream from the insertion flow path section; and a valve mechanism that prevents passage of the atmosphere through the channel in a fueling period. This contributes to reduction in introduction of the atmosphere (Continued)

into the fuel flow path through the channel in a fueling period.

7 Claims, 8 Drawing Sheets

(51) Int. Cl.
    *B67D 7/04*         (2010.01)
    *B60K 15/04*       (2006.01)
    *B60K 15/035*     (2006.01)
    *B60K 15/03*       (2006.01)

(52) U.S. Cl.
    CPC .. *B67D 7/0478* (2013.01); *B60K 2015/03256* (2013.01); *B60K 2015/03538* (2013.01); *B60K 2015/048* (2013.01); *B60K 2015/0458* (2013.01); *B60K 2015/0461* (2013.01)

(58) Field of Classification Search
    USPC .................................. 220/86.2; 141/61, 350
    See application file for complete search history.

(56) References Cited

U.S. PATENT DOCUMENTS

| | | | |
|---|---|---|---|
| 6,446,826 B1 * | 9/2002 | Foltz | B60K 15/04 |
| | | | 220/203.01 |
| 9,694,675 B2 * | 7/2017 | Sekihara | B60K 15/04 |
| 2017/0361704 A1 | 12/2017 | Miura | |

FOREIGN PATENT DOCUMENTS

| | | |
|---|---|---|
| JP | 2008-94271 A | 4/2008 |
| JP | 2013-071503 | 4/2013 |
| JP | 2015-150937 A | 8/2015 |

OTHER PUBLICATIONS

Office Action dated Jan. 21, 2020 issued in corresponding JP patent application No. 2016-192632 (and English translation).

\* cited by examiner

Fig.8

FUELING DEVICE

CROSS-REFERENCE TO RELATED APPLICATION

The present application claims priority from Japanese application P2016-192632 filed on Sep. 30, 2016, the content of which is hereby incorporated by reference into this application.

BACKGROUND

1. Field

The present invention relates to a fueling device.

2. Related Art

A fueling device is used for guiding fuel supplied from a fueling nozzle to a fuel tank. The fueling device includes a channel forming member that forms a nozzle insertion channel where a fueling nozzle is to be inserted, and a cover member attached to the channel forming member. The fueling device includes an annular channel provided between the channel forming member and the cover member. The annular channel is intended to establish communication between the nozzle insertion channel and the atmosphere. Such a configuration is disclosed in JP2013-71503A for example.

In this fueling device, the annular channel communicates with the nozzle insertion channel on an upper end side of the channel forming member. This causes a risk that the atmosphere will be taken into the nozzle insertion channel through the annular channel in a period when fuel is supplied in response to insertion of the fueling nozzle. The atmosphere taken into the nozzle insertion channel is accidentally introduced toward the fuel tank through a flow path downstream from the nozzle insertion channel in response to release of fuel from the fueling nozzle. This may contribute to the occurrence of air bubbles in the fuel in the tank Under these circumstances, a request has been raised to reduce introduction of the atmosphere into the nozzle insertion channel through the annular channel in a fueling period.

SUMMARY

The present invention has been made to solve at least part of the above-described problem. The present invention is feasible in the form of the following aspects.

(1) According to one aspect of the present invention, a fueling device is provided. The fueling device guides fuel supplied from a fueling nozzle to a fuel tank. The fueling device may include: a filler neck including a fuel flow path communicating with the fuel tank; and a channel forming member attached to the filler neck on a nozzle insertion side where the fueling nozzle is to be inserted. The channel forming member includes: a flow path forming wall section that forms at least a part of an insertion flow path section for the fueling nozzle in the fuel flow path on the nozzle insertion side; and a barrier section that forms a channel surrounding at least a part of the insertion flow path section about an axis of the fuel flow path so as to separate the channel from the insertion flow path section. The barrier section of the channel forming member includes an atmosphere communication hole for making the channel communicate with the atmosphere, a flow path communication hole for making the channel communicate with an insertion end flow path section downstream from the insertion flow path section, and a valve mechanism that interrupts passage of the atmosphere through the channel in a fueling period.

In the fueling device according to this aspect, passage of the atmosphere through the channel is prevented in a fueling period in a range from the atmosphere communication hole to the flow path communication hole. Thus, the channel will not communicate with the insertion end flow path section downstream from the insertion flow path section. As a result, the fueling device according to this aspect becomes capable of reducing introduction of the atmosphere into the insertion flow path section through the channel in a fueling period and additionally, introduction of the atmosphere into the insertion end flow path section through the channel in the fueling period.

(2) In the fueling device according to the above-described aspect, while the fueling device is fixed to a fueling room of a vehicle, the flow path communication hole may be located above the atmosphere communication hole in a vertical direction. By doing so, even if water mixed in the atmosphere is taken into the channel together with the atmosphere through the atmosphere communication hole, the water becomes less likely to be carried toward the flow path communication hole located above the atmosphere communication hole in the vertical direction.

(3) In the fueling device according to the above-described aspect, the channel forming member may include multiple barrier members provided to the channel and aligned along the channel to partially block a channel cross section of the channel. By doing so, even if water or dust mixed in the atmosphere is taken into the channel together with the atmosphere through the atmosphere communication hole, the atmosphere collides with the multiple barrier members at the channel while the atmosphere having flowed in through the atmosphere communication hole passes through the channel. In this way, the water or dust in the atmosphere stays at positions where the atmosphere collides with the barrier members. As a result, the fueling device according to this aspect becomes capable of increasing water resistance and dust resistance at the insertion flow path section for the fueling nozzle.

(4) In the fueling device according to the above-described aspect, the barrier section may include the multiple barrier members aligned along the channel and arranged alternately to a channel inner wall and a channel outer wall facing each other across the channel. This makes the atmosphere flow through the annular channel in a zigzag pattern. This makes it possible to increase water resistance and dust resistance more reliably at the insertion flow path section for the fueling nozzle.

The present invention is feasible in the form of various aspects. For example, the present invention is feasible as an open-close device for an insertion port where a fueling nozzle is to be inserted.

DESCRIPTION OF THE EMBODIMENTS

Figure 1:
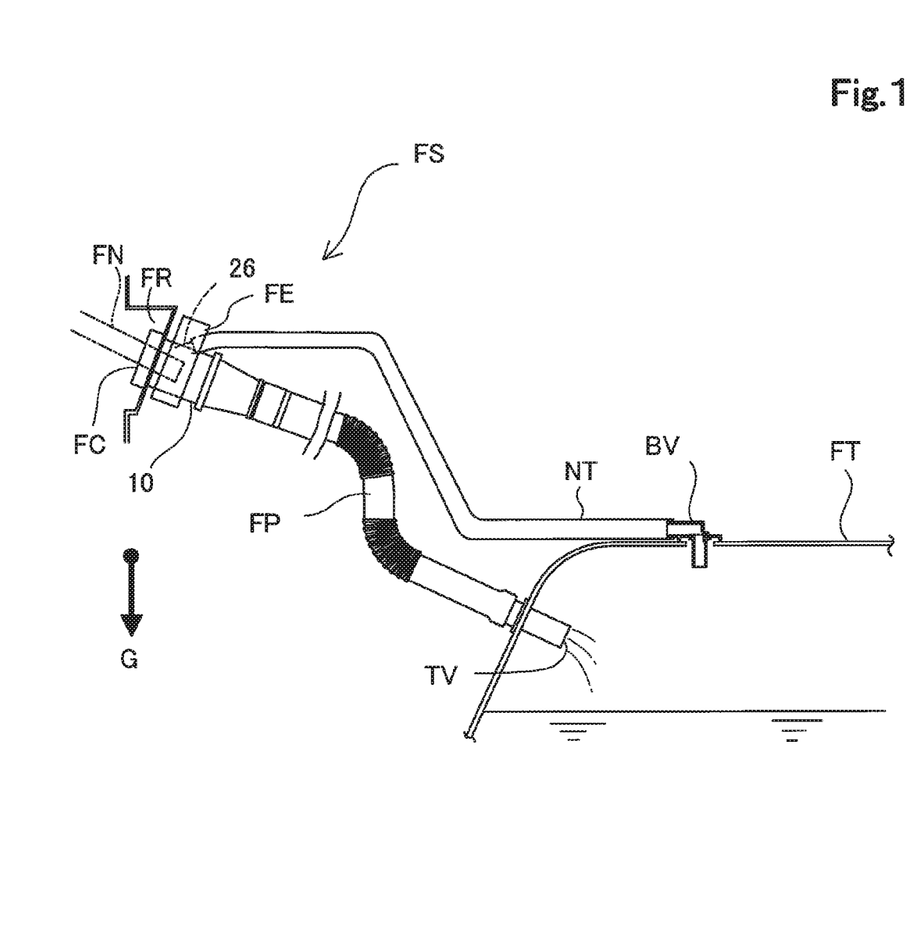
FIG. 1 is an explanatory view showing the outline of a fueling device that guides fuel supplied from a fueling nozzle to a fuel tank of a vehicle.

FIG. 1 is an explanatory view showing the outline of a fueling device FS that guides fuel supplied from a fueling nozzle FN to a fuel tank FT of a vehicle. FIG. 1 and each of its subsequent drawings include an arrow G indicating a vertical direction. The fueling device FS according to this embodiment includes a filler neck 10, a fuel vapor port 26, a filler pipe FP, a check valve TV, a fuel vapor tube NT, a gas emission valve BV, and an attachment member FE. The filler neck 10 is fixed to a fueling room FR of a vehicle with the attachment member FE. A fueling port FC as an insertion port accepts the fueling nozzle FN to be inserted. The filler neck 10 is connected to the fuel tank FT through the filler pipe FP and the fuel vapor tube NT. The filler pipe FP is a resin tube having bellows structures at two points, for example. The filler pipe FP is allowed to expand, contract, and bend within a certain range. The filler pipe FT is connected to the fuel tank FT through the check valve TV. Fuel released from the fueling nozzle FN inserted in the fueling port FC passes through a fuel flow path described later formed by the filler neck 10 and the filler pipe FP to be guided into the fuel tank FT through the check valve TV. The check valve TV prevents a back flow of the fuel from the fuel tank FT into the filler pipe FP.

The fuel vapor tube NT has one end connected to the fuel tank FT through the gas emission valve BV and an opposite end connected to the fuel vapor port 26 protruding from the filler neck 10. The gas emission valve BV also functions as a joint for connecting the fuel vapor tube NT to the fuel tank FT. Air in a tank containing fuel vapor flows into the fuel vapor tube NT through the gas emission valve BV. During supply of fuel from the fueling nozzle FN, the fuel vapor and the supplied fuel pass through the filler pipe FP together to be guided into the fuel tank FT.

Figure 2:
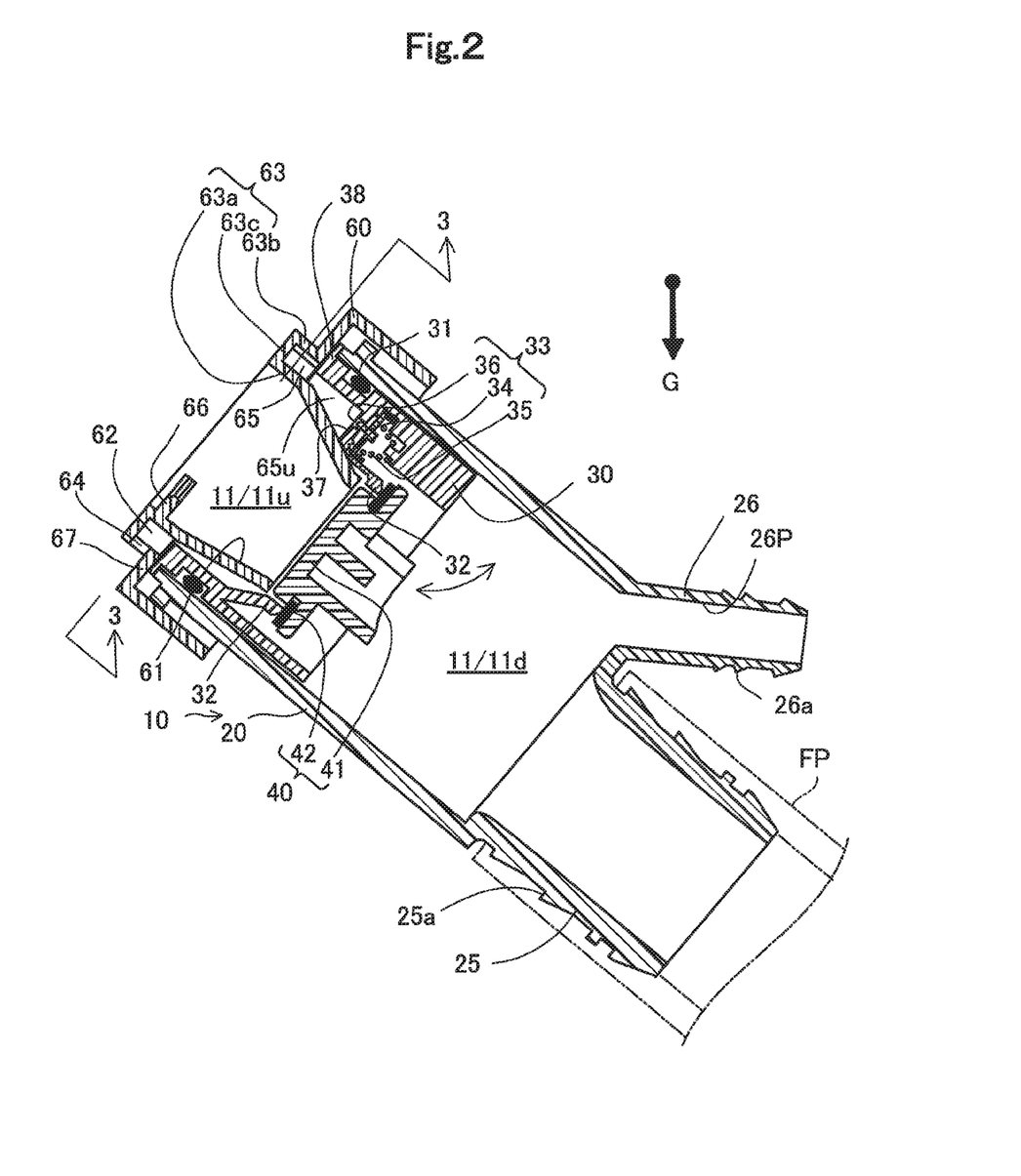
FIG. 2 is an explanatory view showing the cross section of a filler neck taken in a longitudinal direction while the filler neck is fixed to a fueling room of a vehicle.
Figure 3:
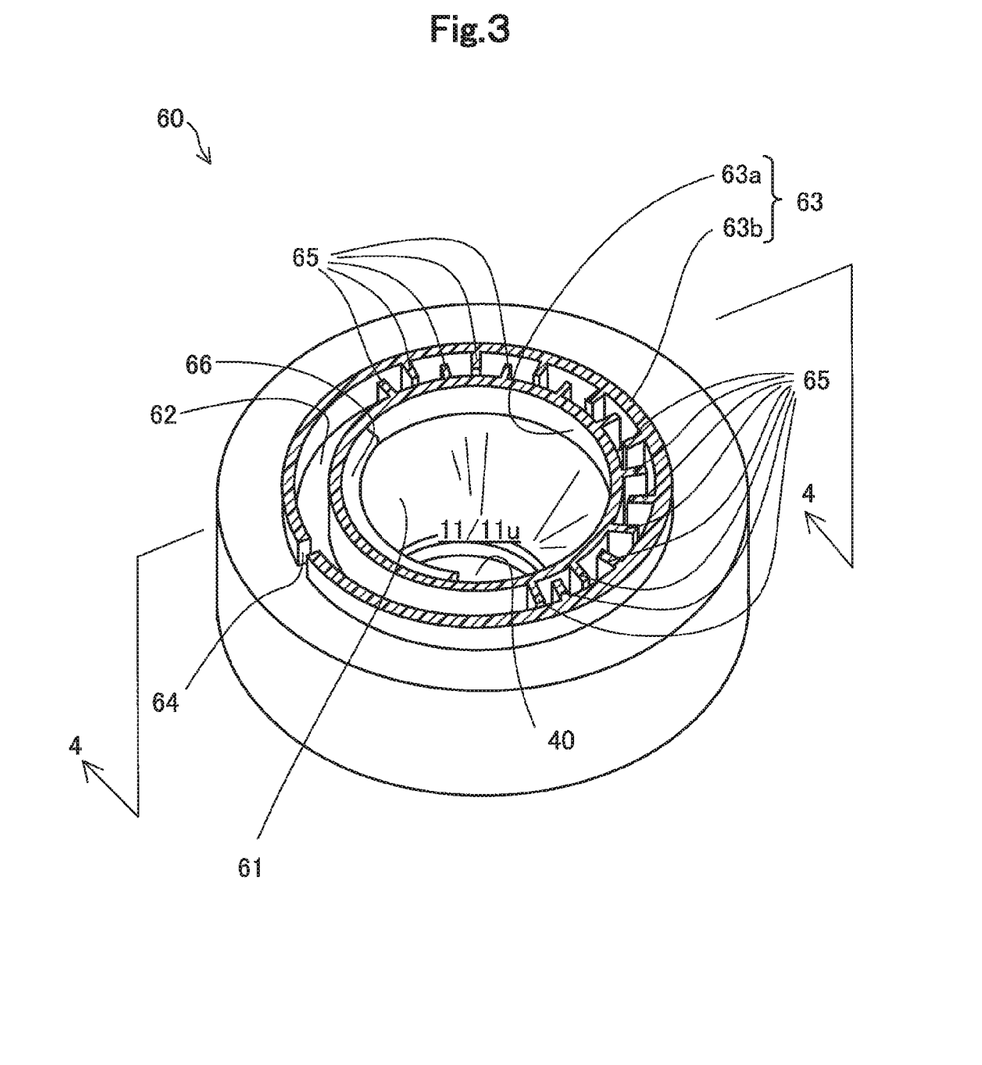
FIG. 3 shows a principal part of a channel forming member in a cutaway perspective view taken along a line 3-3 of FIG. 2.
Figure 4:
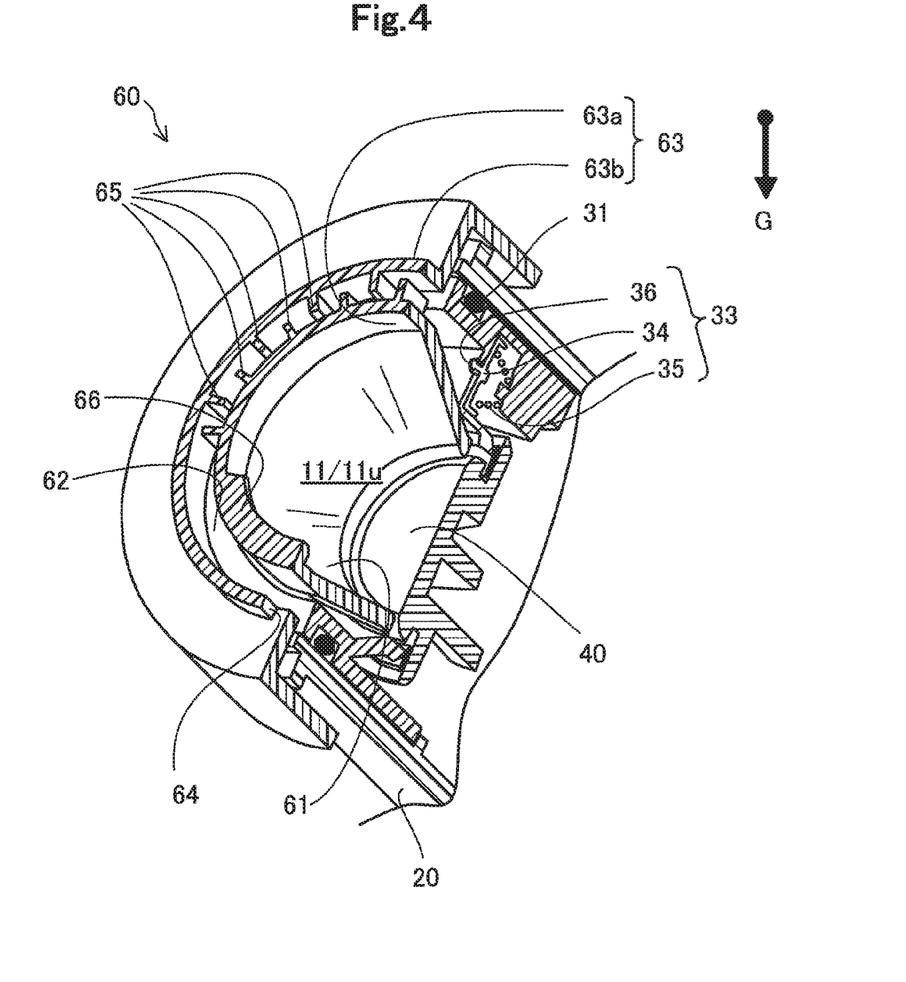
FIG. 4 shows the cross section of the channel forming member and those of its peripheral members in a cutaway perspective view taken in a longitudinal direction along a line 4-4 of FIG. 3.

The configuration of a principal part of the fueling device FS will be described in detail. FIG. 2 is an explanatory view showing the cross section of the filler neck 10 taken in a longitudinal direction while the filler neck 10 is fixed to the fueling room FR of a vehicle. FIG. 3 shows a principal part of a channel forming member 60 in a cutaway perspective view taken along a line 3-3 of FIG. 2. FIG. 4 shows the cross section of the channel forming member 60 and those of its peripheral members in a cutaway perspective view taken in a longitudinal direction along a line 4-4 of FIG. 3. As shown in these drawings, the filler neck 10 is fixed to the fueling room FR (see FIG. 1) while being tilted from the vertical direction. The filler neck 10 is a mechanism for feeding fuel released from the fueling nozzle FN (see FIG. 1) to the fuel tank FT through the filler pipe FP (see FIG. 1) connected to the lower end of the filler neck 10. The filler neck 10 includes a neck body 20, a channel forming auxiliary member 30, a lower end open-close mechanism 40, and the channel forming member 60. With the presence of the neck body 20 of a cylindrical shape, the filler neck 10 forms a fuel flow path 11 extending from the fueling port FC closer to the channel forming member 60 to the end of the neck body 20. The fuel flow path 11 is partitioned by the channel forming auxiliary member 30 into an insertion flow path section 11$u$ for the fueling nozzle FN on an upstream side closer to the fueling port FC, and an insertion end flow path section 11$d$ on a downstream side.

The neck body 20 includes the channel forming auxiliary member 30 and the channel forming member 60 attached to the upstream side of the fuel flow path 11. A part of the neck body 20 closer to the end of the fuel flow path 11 functions as a neck connection 25. The neck connection 25 includes an annular protrusion 25$a$ provided on the outer periphery of the neck connection 25. By being inserted into the neck connection 25, the filler pipe FP is connected to the neck connection 25 while being retained with the annular protrusion 25$a$. The neck body 20 further includes the fuel vapor port 26 protruding from the base and its periphery of the neck connection 25. The fuel vapor port 26 is a pipe member branching from the neck body 20. The fuel vapor port 26 forms an air flow path 26P branching from the fuel flow path 11. The fuel vapor port 26 also includes an annular protrusion 26$a$ provided on the outer periphery of the fuel vapor port 26. By being inserted into the fuel vapor port 26, the fuel vapor tube NT (see FIG. 1) is connected to the fuel vapor port 26 while being retained with the annular protrusion 26$a$. The fuel vapor tube NT connected to the fuel vapor port 26 is used for causing air containing fuel vapor in the tank of the fuel tank FT (see FIG. 1) to flow back to the filler neck 10 in a fueling period, thereby achieving smooth fueling. The fuel vapor port 26 may be provided at any position on the outer periphery of the filler neck 10.

The neck body 20 including the neck connection 25 and the fuel vapor port 26 is made of a resin material having excellent fuel permeation resistance functioning to reduce permeation of fuel. Examples of this material include polyamide (PA) such as nylon and ethylene-vinylalcohol copolymer (EVOH). The neck body 20 may have a two-layer structure with an inner layer and an outer layer. The outer layer may be made of a resin material having excellent mechanical strength such as polyethylene (PE), for example. By doing so, the outer layer becomes usable for ensuring the mechanical strength and the impact resistance of the neck body 20. If this outer layer is made of polyethylene, a resin material denatured with maleic acid (modified polyethylene) is usable as a polar functional group. Modified polyethylene is bonded to PA by means of chemical adhesion. Thus, using modified polyethylene achieves adhesion to the inner layer.

The channel forming auxiliary member 30 is integrated into the fuel flow path 11 from an upper end opening side of the neck body 20 and welded with heat to the neck body 20 at an upper end flange section 38. An annular seal member 31 having elasticity is provided in an outer wall recess of the channel forming auxiliary member 30 to seal the inner wall of the neck body 20 and the outer wall of the channel forming auxiliary member 30 in an air-tight and liquid-tight fashion. The channel forming auxiliary member 30 includes an annular seal lip wall 32 and a negative pressure relief valve mechanism 33. Further, the channel forming auxiliary member 30 supports the lower end open-close mechanism 40 to be opened and closed by the fueling nozzle FN. The seal lip wall 32 surrounds the fuel flow path 11 near a boundary between the insertion flow path section 11u and the insertion end flow path section 11d. The seal lip wall 32 has a lower end functioning as an annular lip section for sealing of the fuel flow path 11. Like the neck body 20, the channel forming auxiliary member 30 is made of PA having fuel permeation resistance, for example.

The negative pressure relief valve mechanism 33 is integrated into a lower portion of an intermediate wall 37 protruding radially inwardly from an opening wall of the channel forming auxiliary member 30 to hold a valve body 34 with a spring 35. A tip portion of the valve body 34 is inserted into an opening 36 formed in the intermediate wall 37 to open and close the opening 36. The opening 36 is provided at a position where the insertion flow path section 11u and the insertion end flow path section 11d are continuous with each other to establish communication between these flow path sections. Thus, if a side where the insertion end flow path section 11d belongs is placed in a negative-pressure, the valve body 34 moves in response to a pressure difference toward a direction in which the spring 35 contracts to open the opening 36. In this way, the negative pressure relief valve mechanism 33 relieves the negative pressure. Specifically, the negative pressure relief valve mechanism 33 is a valve mechanism that opens the opening 36 if a tank internal pressure in the fuel tank FT is reduced to a level lower than atmospheric pressure. The negative pressure relief valve mechanism 33 constitutes one form of a valve mechanism that prevents passage of the atmosphere through an annular channel 62 described later in a fueling period. The valve body 34 of the negative pressure relief valve mechanism 33 is also made of PA, for example.

The lower end open-close mechanism 40 is integrated into the channel forming auxiliary member 30 and includes an open-close member 41 to which a seal member 42 having elasticity is attached. The lower end open-close mechanism 40 opens and closes the insertion flow path section 11u by pressing the seal member 42 against a tip lip of the seal lip wall 32. The open-close member 41 is rotatable in directions of arrows shown in FIG. 2 about a bearing section not shown in the drawings incorporated into the channel forming auxiliary member 30. The open-close member 41 always receives the biasing force of a spring not shown in the drawings incorporated into the channel forming auxiliary member 30. Thus, when the fueling nozzle FN is not inserted so fuel is not supplied, the lower end open-close mechanism 40 presses the seal member 42 of the open-close member 41 against the tip lip of the seal lip wall 32 to close the insertion flow path section 11u. Meanwhile, when the fueling nozzle FN is inserted so fuel is supplied, the open-close member 41 is pressed with the tip of the inserted fueling nozzle FN. As a result, the lower end open-close mechanism 40 rotates the open-close member 41 toward a peripheral wall of the neck body 20 to open the insertion flow path section au to make the insertion flow path section 11u communicate with the insertion end flow path section 11d. The open-close member 41 of the lower end open-close mechanism 40 is made of POM or PA, for example.

The channel forming member 60 is attached to the filler neck 10 on a nozzle insertion side where the fueling nozzle FN (see FIG. 1) is to be inserted. The channel forming member 60 includes a flow path forming wall section 61, a barrier section 63, and a nozzle guide protrusion 66. The flow path forming wall section 61 is an annular member located radially inwardly of the fuel flow path 11 relative to the seal lip wall 32 of the channel forming auxiliary member 30. The flow path forming wall section 61 forms the insertion flow path section 11u as an insertion flow path section for the fueling nozzle FN in the fuel flow path 11 on the nozzle insertion side. The flow path forming wall section 61 guides the fueling nozzle FN toward the lower end open-close mechanism 40. If the channel forming member 60 includes a different member of a flap valve type attached to the channel forming member 60, the flow path forming wall section 61 forms at least a part of the insertion flow path section 11u.

The barrier section 63 is formed so as to separate the annular channel 62 surrounding the insertion flow path section 11u about an axis of the insertion flow path section 11u from the flow path forming wall section 61. The barrier section 63 is formed of a channel inner wall 63a and a channel outer wall 63b facing each other across the annular channel 62, and a ceiling wall 63c. The channel inner wall 63a extends from the upper end of the flow path forming wall section 61. As shown in FIG. 2, while being attached to the filler neck 10, the channel forming member 60 establishes continuity between the annular channel 62 surrounded by the channel inner wall 63a, the channel outer wall 63b, and the ceiling wall 63c of the barrier section 63 and a communication room 65u at the lower end of the flow path forming wall section 61. The channel forming auxiliary member 30 located downstream from the channel forming member 60 includes the intermediate wall 37 located at a position facing an atmosphere communication hole 64 shown in FIG. 3. Thus, in a residual area where the intermediate wall 37 does not exist, an upper end flange section 67 functions as a bottom wall of the annular channel 62. As already described above, the channel forming member 60 includes the opening 36 provided in the intermediate wall 37 of the channel forming auxiliary member 30 functioning as a bottom wall of the communication room 65u. The opening 36 functions as a flow path communication hole for making the annular channel 62 communicate with the fuel flow path 11 in an area downstream from the insertion flow path section 11u.

The channel forming member 60 includes the atmosphere communication hole 64 provided in the channel outer wall 63b of the barrier section 63. The atmosphere communication hole 64 is to make the annular channel 62 communicate with the atmosphere. As shown in FIGS. 2 and 4, while the fueling device FS, specifically, the filler neck 10 is fixed to the fueling room FR of a vehicle, the opening 36 and the atmosphere communication hole 64 are arranged in such a manner that the opening 36 is located above the atmosphere communication hole 64 in the vertical direction. The channel forming member 60 includes multiple barrier members 65 provided to the channel inner wall 63a and the channel outer wall 63b. As shown in FIG. 3, the barrier members 65 protrude from the channel inner wall 63a and the channel outer wall 63b alternately and are aligned along the annular channel 62 so as to partially block a channel cross section of the annular channel 62. Like the neck body 20, the channel forming member 60 having the above-described configuration is made of PA having fuel permeation resistance, for example.

Figure 5:
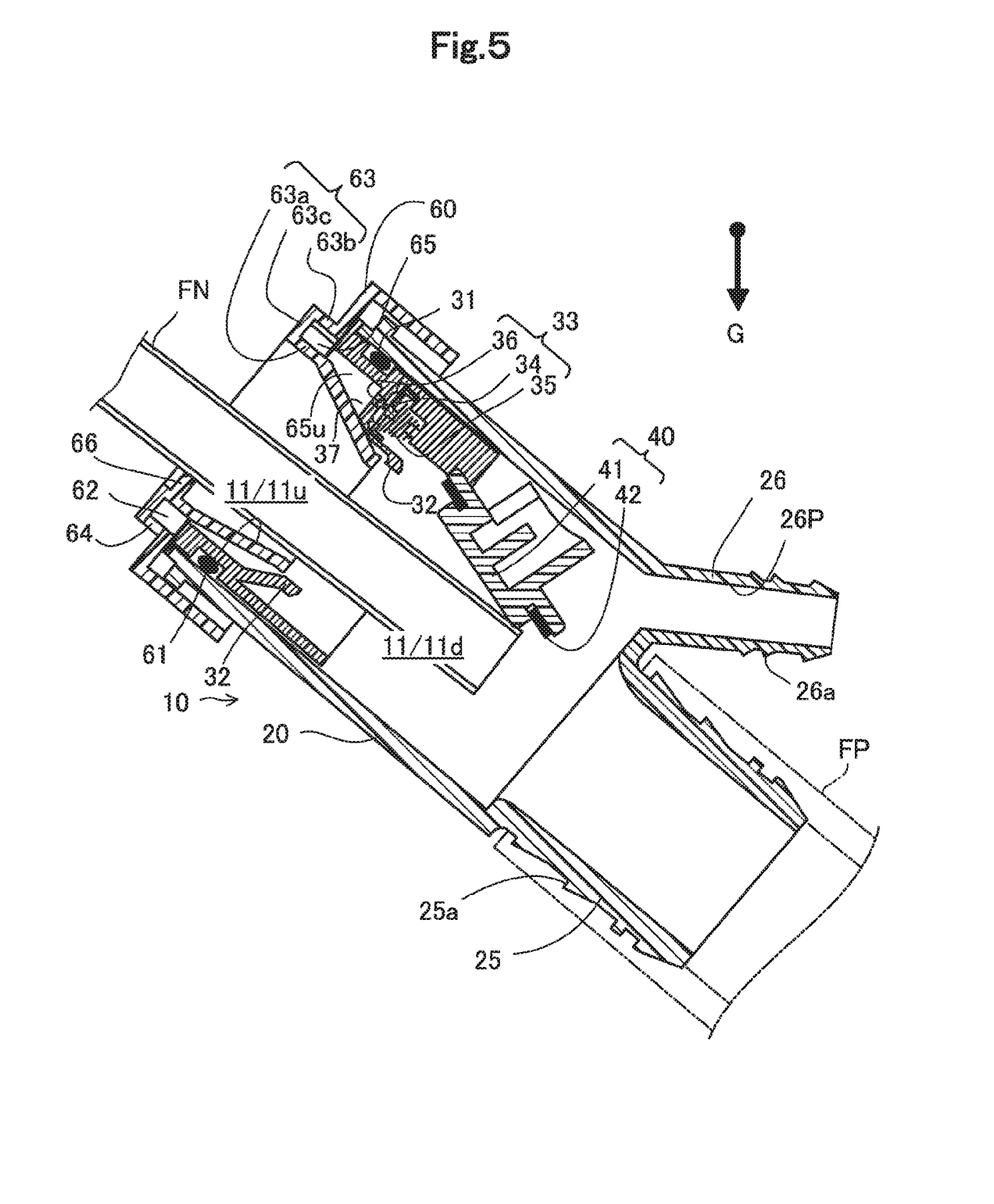
FIG. 5 is an explanatory view showing a fueling nozzle and the behavior of a lower end open-close mechanism in association with each other at a time when insertion of the fueling nozzle is completed.

FIG. 5 is an explanatory view showing the fueling nozzle FN and the behavior of the lower end open-close mechanism 40 in association with each other at a time when insertion of the fueling nozzle FN is completed. While fuel is supplied using the fueling device FS according to this embodiment, the fueling nozzle FN is guided along the nozzle guide protrusion 66 of the channel forming member 60 to be inserted into the insertion flow path section 11u. At this time, a nozzle tip is pressed against the open-close member 41 of the lower end open-close mechanism 40. Insertion of the fueling nozzle FN continues thereafter. Then, as shown in FIG. 5, the fueling nozzle FN presses the open-close member 41 to rotate the open-close member 41 and reaches a position in the insertion end flow path section 11d. After the inserted fueling nozzle FN reaches this position, fuel is released from the fueling nozzle FN. The released fuel passes through the filler pipe FP connected to the neck connection 25 of the filler neck 10 to be guided into the fuel tank FT (see FIG. 1).

In the above-described fueling device FS according to this embodiment in the assembled state shown in FIG. 1, the filler neck 10 is fixed to the fueling room FR while being tilted from the vertical direction, and the channel forming member 60 attached to the filler neck 10 is located in the fueling room FR of a vehicle. In the fueling room FR, the fueling device FS permits air (the atmosphere) in the fueling room FR to flow in through the atmosphere communication hole 64 of the channel forming member 60 shown in FIGS. 2 to 4. The atmosphere having flowed in through the atmosphere communication hole 64 passes through the annular channel 62. During passage through the annular channel 62, the atmosphere collides with the multiple barrier members 65 at the annular channel 62. Thus, in the fueling device FS according to this embodiment, water or dust in the atmosphere stays at positions and their vicinities where the atmosphere collides with the barrier members 65. This achieves high water resistance and high dust resistance at the insertion flow path section 11u where the fueling nozzle FN is to be inserted.

The fueling device FS according to this embodiment includes the multiple barrier members 65 arranged along the annular channel 62 and provided alternately to the channel inner wall 63a and the channel outer wall 63b facing each other across the annular channel 62. This makes the atmosphere flow through the annular channel 62 in a zigzag pattern for a predetermined distance. Thus, the fueling device FS according to this embodiment becomes capable of increasing water resistance and dust resistance further at the insertion flow path section 11u where the fueling nozzle FN is to be inserted.

The fueling device FS according to this embodiment makes the negative pressure relief valve mechanism 33 open the opening 36 if a tank internal pressure in the fuel tank FT is reduced to a level lower than atmospheric pressure. Thus, in a fueling period when a tank internal pressure becomes substantially the same as atmospheric pressure, the fueling device FS according to this embodiment makes the negative pressure relief valve mechanism 33 close the opening 36 to prohibit communication of the annular channel 62 with the insertion end flow path section 11d downstream from the insertion flow path section 11u. As a result, the fueling device FS according to this embodiment becomes capable of reducing both introduction of the atmosphere into the insertion flow path section 11u through the annular channel 62 in a fueling period and introduction of the atmosphere into the insertion end flow path section 11d through the annular channel 62 in the fueling period.

In the fueling device FS according to this embodiment, the filler neck 10 is fixed to the fueling room FR while being tilted from the vertical direction. In this state, the opening 36 is located above the atmosphere communication hole 64 in the vertical direction. Thus, even if water mixed in the atmosphere is taken into the annular channel 62 together with the atmosphere through the atmosphere communication hole 64, the water becomes less likely to be carried toward the opening 36 above the atmosphere communication hole 64 in the vertical direction. Additionally, as described above, the fueling device FS according to this embodiment includes the multiple barrier members 65 provided to the annular channel 62 arranged alternately along the annular channel 62. Thus, the water is still less likely to be carried toward the opening 36.

The present invention is not limited to the above-described embodiments, examples, or modifications but is feasible in the form of various configurations within a range not deviating from the substance of the invention. For example, technical features in the embodiments, those in the examples, or those in the modifications corresponding to those in each of the aspects described in SUMMARY can be replaced or combined, where appropriate, with the intention of solving some or all of the aforementioned problems or achieving some or all of the aforementioned effects. Unless being described as absolute necessities in this specification, these technical features may be deleted, where appropriate.

Figure 6:
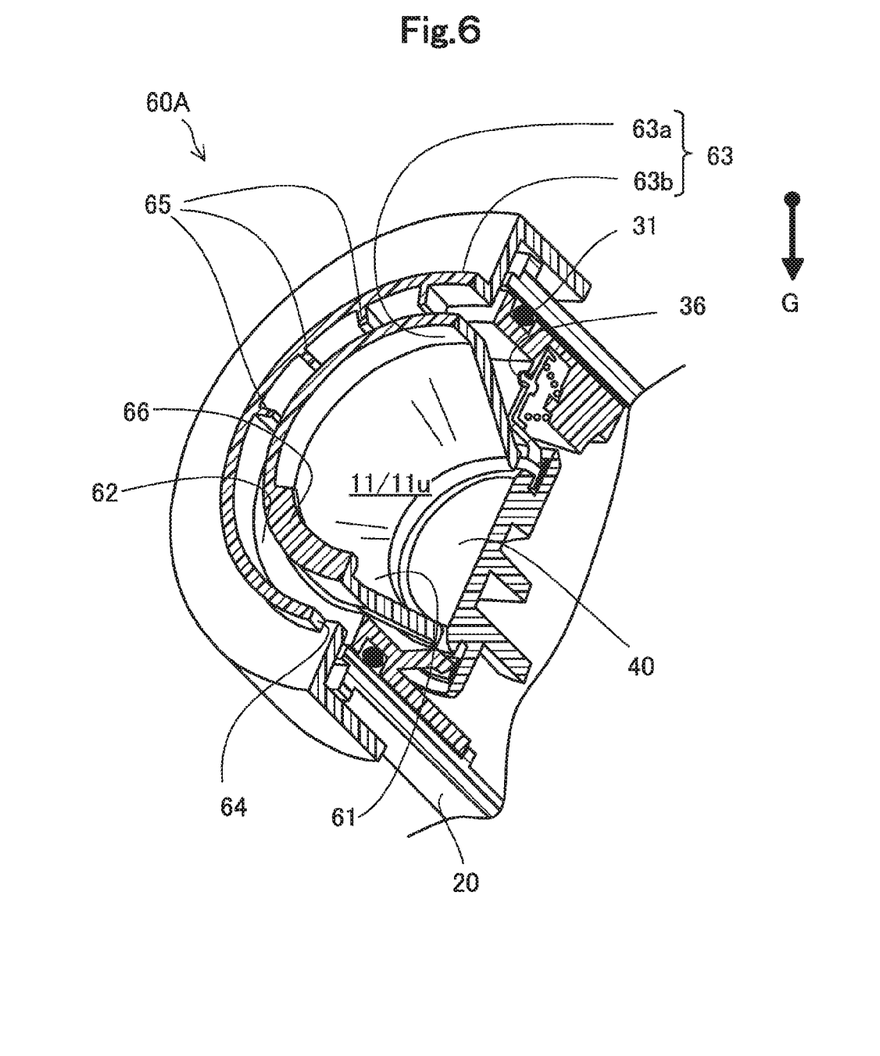
FIG. 6 shows the cross section of a channel forming member and those of its peripheral members in a cutaway perspective view taken in a longitudinal direction according to a modification where multiple barrier members are provided to a channel outer wall of an annular channel.
Figure 7:
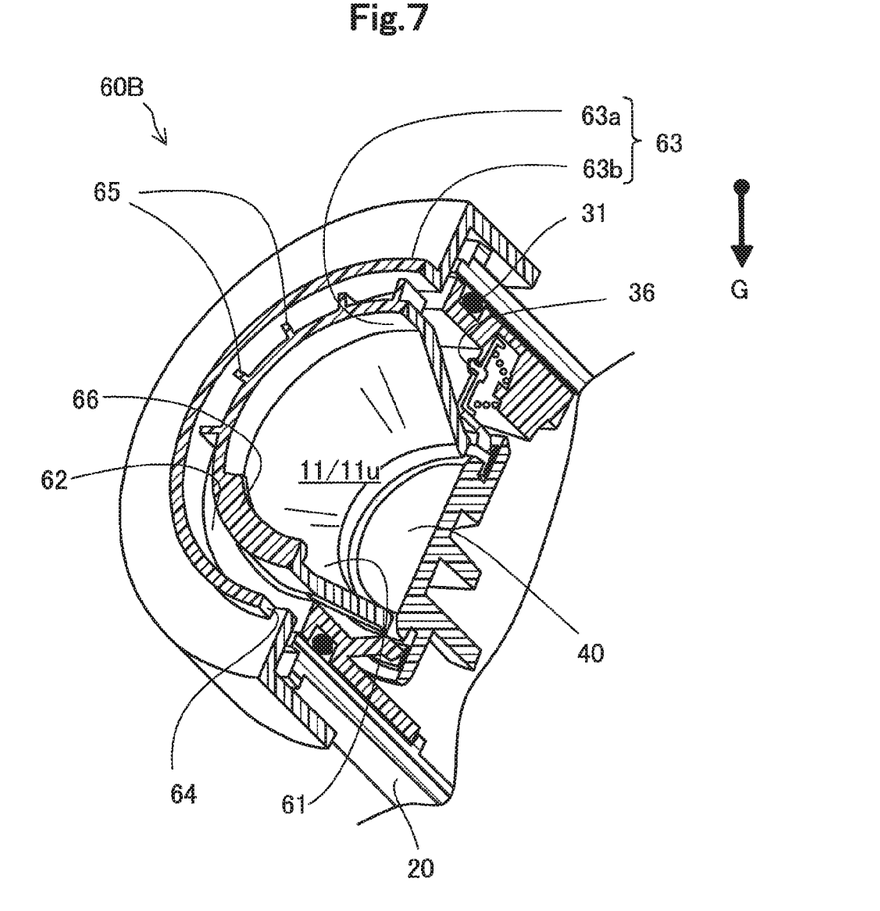
FIG. 7 shows the cross section of a channel forming member and those of its peripheral members in a cutaway perspective view taken in a longitudinal direction according to a modification where multiple barrier members are provided to a channel inner wall of an annular channel.

According to the above-described embodiment, the multiple barrier members 65 are provided alternately to the channel inner wall 63a and the channel outer wall 63b of the annular channel 62. Alternatively, the multiple barrier members 65 may be provided to one of the channel inner wall 63a and the channel outer wall 63b. FIG. 6 shows the cross section of a channel forming member 60A and those of its peripheral members in a cutaway perspective view taken in a longitudinal direction according to a modification where the multiple barrier members 65 are provided to the channel outer wall 63b of the annular channel 62. FIG. 7 shows the cross section of a channel forming member 60B and those of its peripheral members in a cutaway perspective view taken in a longitudinal direction according to a modification where the multiple barrier members 65 are provided to the channel inner wall 63a of the annular channel 62. According to these modifications and the above-described embodiment, the number of the barrier members 65 may be determined appropriately in consideration of water resistance or dust resistance. The barrier members 65 may be of a plate-like shape having a rectangular cross section shown in FIG. 3. Alternatively, the barrier members 65 may be of a chevron plate-like shape having a triangular cross section. Still alternatively, the barrier members 65 may be of a plate-like shape having a T cross section. According to the above-described embodiment, the barrier members 65 are provided in a partial area of the annular channel 62. Alternatively, the barrier members 65 may be provided in an entire area of the annular channel 62.

According to the above-described embodiment, with the presence of the barrier section 63, the annular channel 62 surrounds the insertion flow path section 11u about an axis of the insertion flow path section 11u. Alternatively, the annular channel 62 may be formed to surround at least a partial area of the insertion flow path section 11u. For example, the annular channel 62 shown in FIG. 3 may be formed as a semi-circular channel. Alternatively; the annular channel 62 may be formed as a channel surrounding the insertion flow path section 11u in a rectangular pattern.

According to the above-described embodiment, there is no different open-close valve mechanism integrated into the channel forming member 60. Alternatively, a different open-close valve mechanism may be attached to the channel forming member 60 so as to cover the channel forming member 60. Such an open-close valve mechanism may be a flap valve type to be opened by pressing the fueling nozzle FN against the valve, or a slide valve type to be opened and closed with sliding motion caused by insertion of the fueling nozzle FN.

Figure 8:
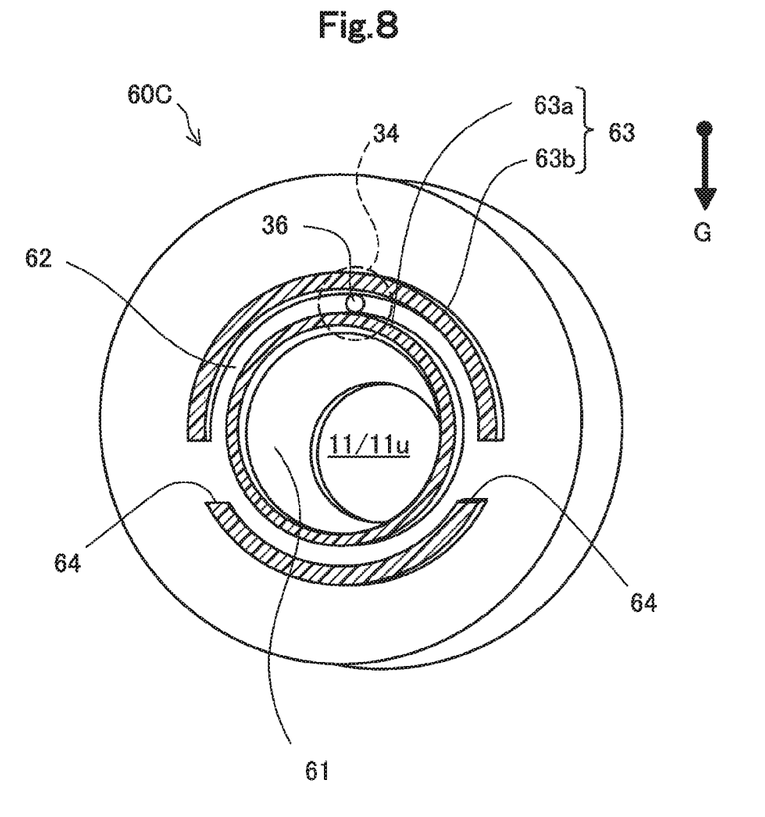
FIG. 8 shows a principal part of a modified channel forming member without a barrier member in a cutaway perspective view at the position corresponding to that of FIG. 3.

According to the above-described embodiment and modifications, the multiple barrier members 65 are provided to the annular channel 62. Alternatively, as long as the opening 36 is closed by the negative pressure relief valve mechanism 33 to interrupt the atmosphere in the annular channel 62 in a fueling period, the barrier members 65 may be omitted. FIG. 8 shows a principal part of a channel forming member 60C without the barrier member 65 in a cutaway perspective view according to a modification taken at a position corresponding to that of FIG. 3. The channel forming member 60C includes two atmosphere communication holes 64. The opening 36 is located above each of the atmosphere communication holes 64 in the vertical direction. This allows the fueling device FS including the filler neck 10 with the attached channel forming member 60C to achieve effect comparable to that described above. In the channel forming member 60C shown in FIG. 8, the channel outer wall 63b partially bulges downwardly in the vertical direction between the two atmosphere communication holes 64. Thus, in the fueling device FS including the filler neck 10 with the attached channel forming member 60C, even if water mixed in the atmosphere is taken into the annular channel 62 together with the atmosphere through each of the atmosphere communication holes 64, the water taken in becomes collectable on the channel outer wall 63b bulging downwardly in the vertical direction. Thus, the water becomes less likely to be carried toward the opening 36.

According to the above-described embodiment, the negative pressure relief valve mechanism 33 constitutes one form of the valve mechanism for preventing passage of the atmosphere through the annular channel 62 in a fueling period. Alternatively, the negative pressure relief valve mechanism 33 may be configured to close the atmosphere communication hole 64 or close the annular channel 62 partially in a fueling period.

What is claimed is:

1. A fueling device that guides fuel supplied from a fueling nozzle to a fuel tank, the fueling device comprising:
    a filler neck including a fuel flow path communicating with the fuel tank; and
    a channel forming member attached to the filler neck on a nozzle insertion side where the fueling nozzle is to be inserted, wherein
    the channel forming member includes:
        a flow path forming wall section that forms at least a part of an insertion flow path section for the fueling nozzle in the fuel flow path on the nozzle insertion side;
        a channel surrounding at least a part of the insertion flow path section about an axis of the fuel flow path; and
        a barrier section separating the channel from the insertion flow path section,
    the barrier section of the channel forming member includes an atmosphere communication hole through which the channel communicates with the atmosphere, a flow path communication hole through which the channel communicates with an insertion end flow path section downstream from the insertion flow path section, and a valve mechanism configured to prevent passage of the atmosphere through the channel in a fueling period, and
    a flow path configured to flow the atmosphere through the atmosphere communication hole into the channel, from the channel through the flow path communication hole of the valve mechanism, and into the insertion end flow path section downstream from the insertion flow path section.

2. The fueling device in accordance with claim 1, wherein the flow path communication hole is located above the atmosphere communication hole in a vertical direction while the fueling device is fixed to a fueling room of a vehicle.

3. The fueling device in accordance with claim 2, wherein the channel forming member includes multiple barrier members provided to the channel and aligned along the channel to partially block a channel cross section of the channel.

4. The fueling device in accordance with claim 3, wherein the barrier section includes the multiple barrier members aligned along the channel and arranged alternately to a channel inner wall and a channel outer wall facing each other across the channel.

5. The fueling device in accordance with claim 1, wherein the channel forming member includes multiple barrier members provided to the channel and aligned along the channel to partially block a channel cross section of the channel.

6. The fueling device in accordance with claim 5, wherein the barrier section includes the multiple barrier members aligned along the channel and arranged alternately to a channel inner wall and a channel outer wall facing each other across the channel.

7. The fueling device in accordance with claim 1, wherein the barrier section includes multiple barrier members aligned along the channel and arranged alternately to a channel inner wall and a channel outer wall facing each other across the channel.

* * * * *